Dec. 6, 1932.  J. J. JAKOSKY  1,889,921
APPARATUS FOR MEASURING DEVIATION OF ROTARY DRILLS FROM THE VERTICAL
Filed May 28, 1930  4 Sheets-Sheet 1
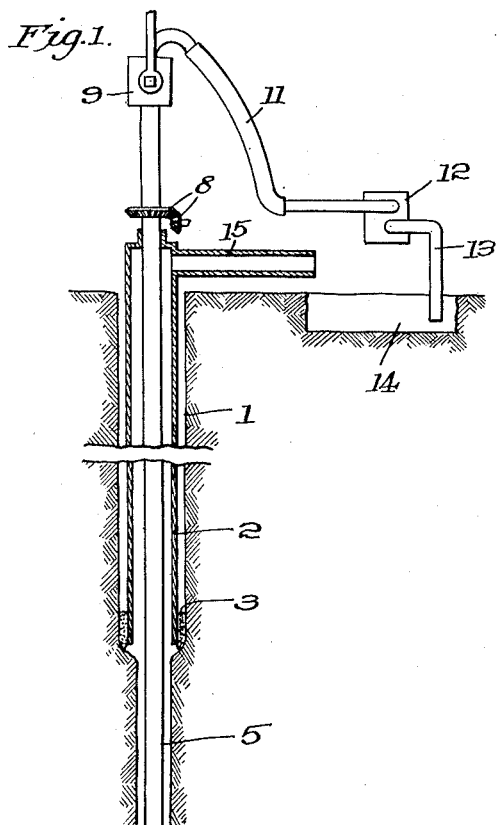
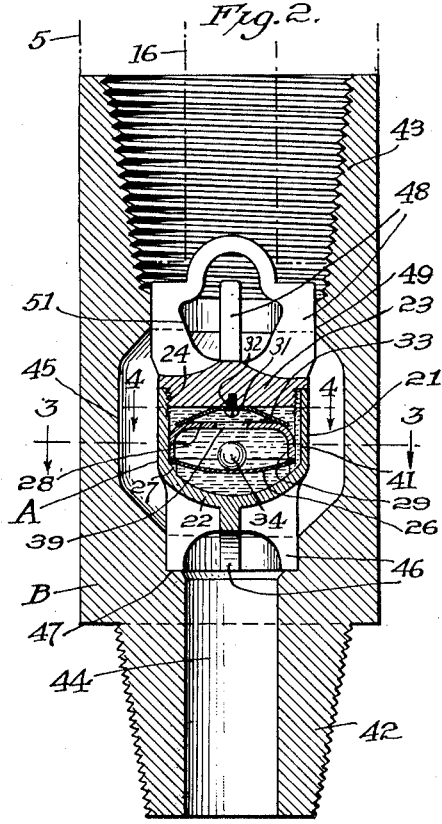
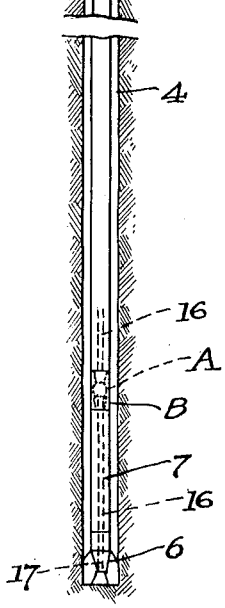
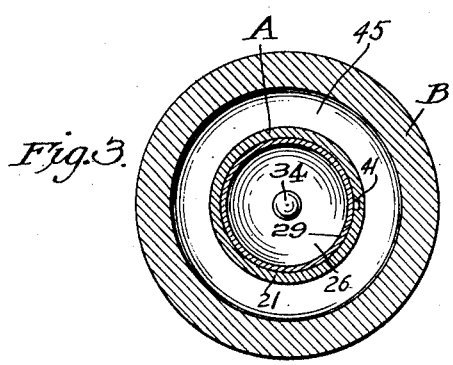
INVENTOR.
John J. Jakosky.
BY
ATTORNEYS.

Dec. 6, 1932.    J. J. JAKOSKY    1,889,921
APPARATUS FOR MEASURING DEVIATION OF ROTARY DRILLS FROM THE VERTICAL
Filed May 28, 1930    4 Sheets-Sheet 2
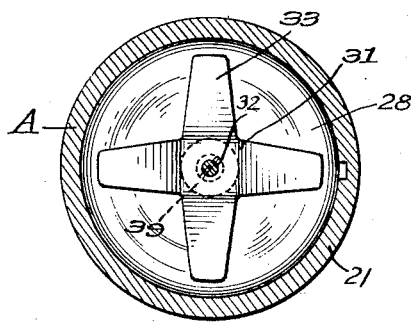
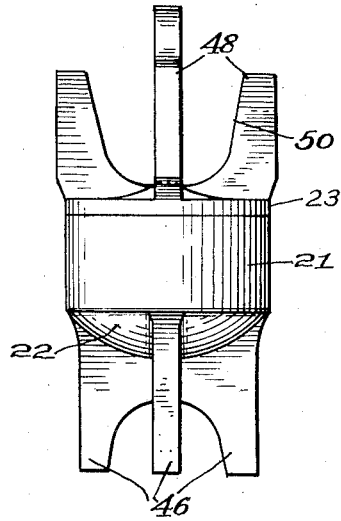
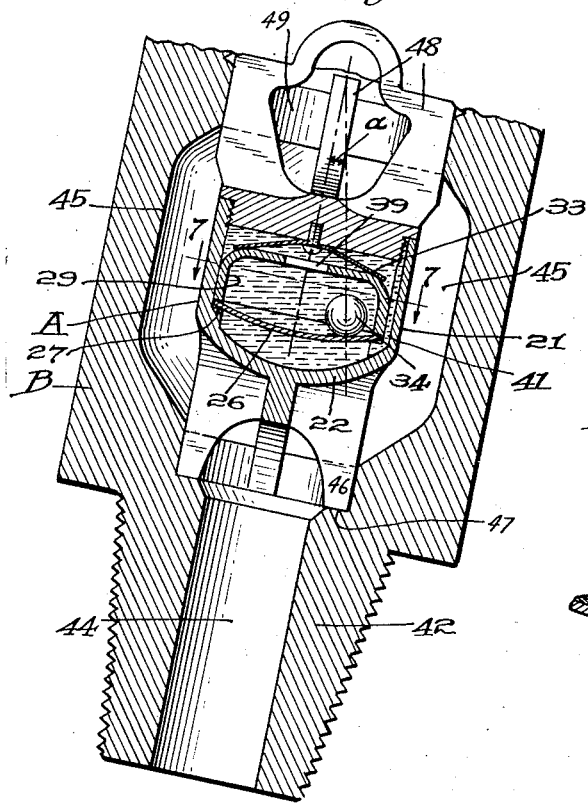
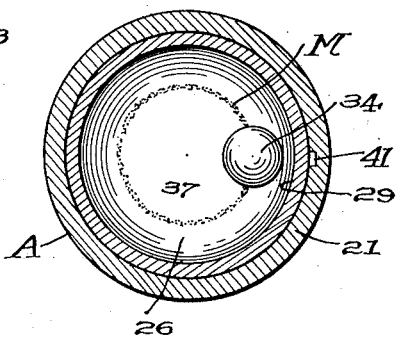
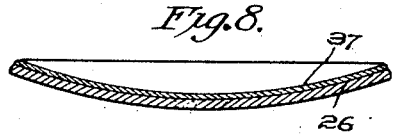
INVENTOR.
John J. Jakosky
BY *Arthur P. Knight and Alfred W. Knight*
ATTORNEYS.

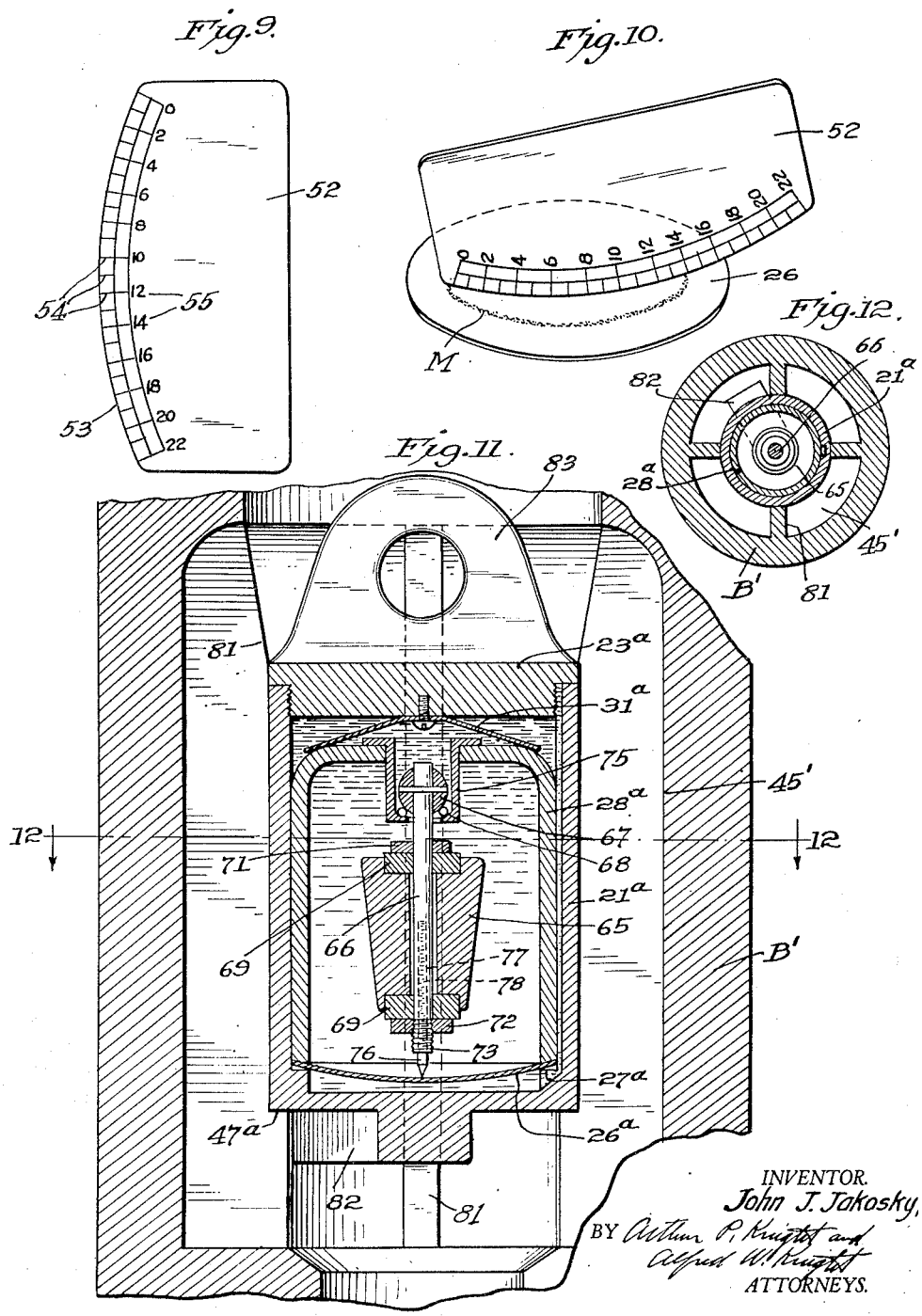

Dec. 6, 1932.   J. J. JAKOSKY   1,889,921
APPARATUS FOR MEASURING DEVIATION OF ROTARY DRILLS FROM THE VERTICAL
Filed May 28, 1930   4 Sheets-Sheet 4
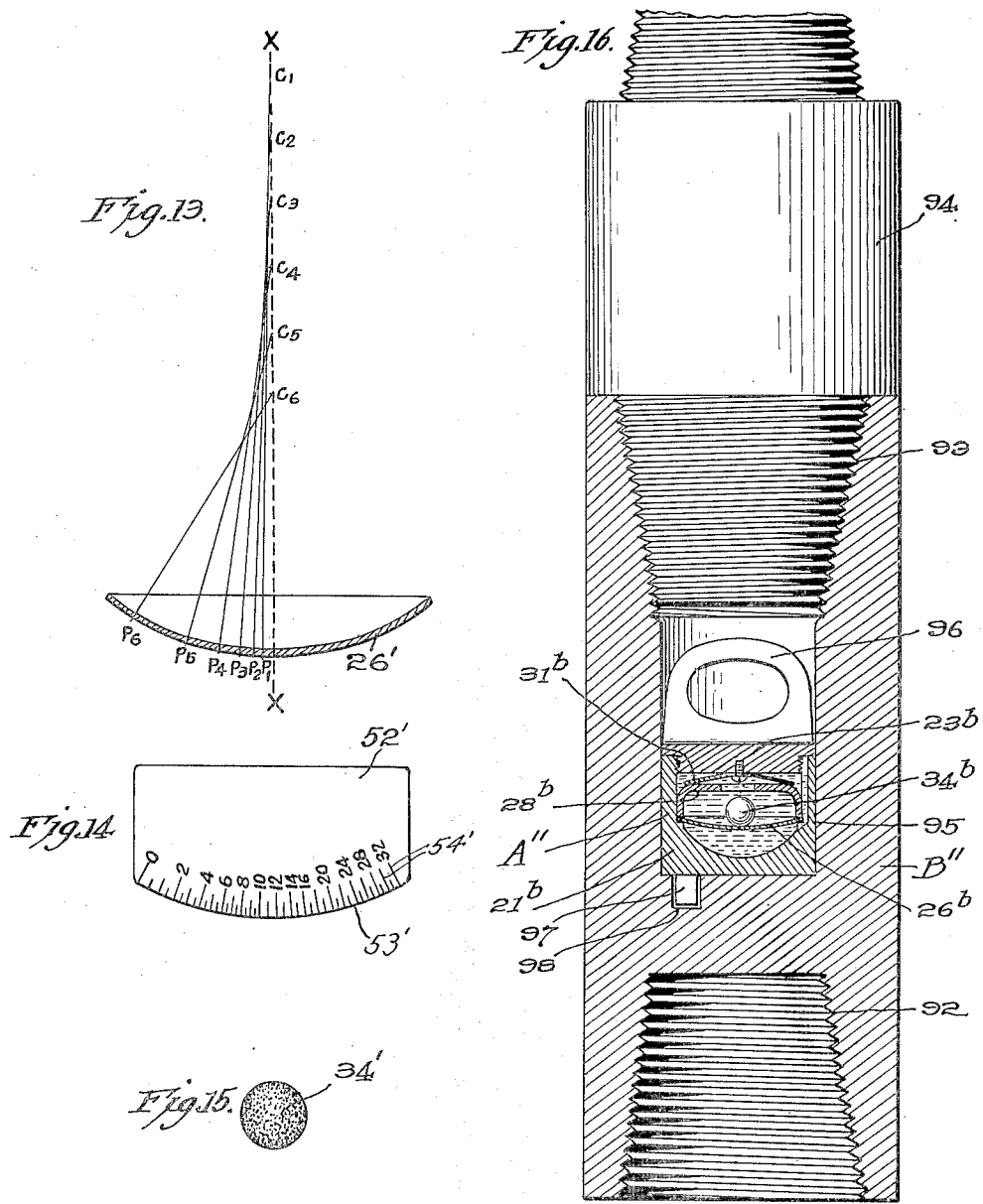
INVENTOR.
John J. Jakosky,
BY
ATTORNEYS.

Patented Dec. 6, 1932

1,889,921

UNITED STATES PATENT OFFICE

JOHN J. JAKOSKY, OF LOS ANGELES, CALIFORNIA, ASSIGNOR TO DRILL GUIDE INCORPORATED, OF LOS ANGELES, CALIFORNIA, A CORPORATION OF NEVADA

APPARATUS FOR MEASURING DEVIATION OF ROTARY DRILLS FROM THE VERTICAL

Application filed May 28, 1930. Serial No. 456,438.

This invention relates to measurement of the deviation of drill holes from the vertical during the drilling thereof, or more particularly the deviation of the drill itself from the vertical, in order that the operator of the drill may be kept informed at all times as to the position of the drill bit with respect to the vertical and may, therefore, take the necessary steps to overcome or eliminate any such deviation beyond what may be considered a reasonable or allowable angle for practical purposes, and the hole may therefore be drilled substantially straight and true. The invention is particularly intended and adapted for use in connection with oil well drills of either the rotary or churn type or with diamond drilling apparatus, but is applicable in general to any drilling apparatus in which the drill pipe or stem is repeatedly rotated, as in a rotary drill, or reciprocated, as in a churn drill, during the drilling operation.

In the drilling of oil wells, diamond drill holes, or other holes into the earth, inclined structures or masses of varying hardness and physical characteristics are often encountered, and these or other reasons frequently cause the drill to be deflected and the bit to assume other than a vertical position, thus causing the hole to drift or deviate from its initial vertically downward direction. Some of the other factors tending to promote this deviation of the drill bit from the vertical, in rotary drilling operations, include the action known as "hydraulicing", that is, erosion of the hole around the bit by the high velocity of the circulating fluid, which causes the hole to become larger than the bit and allows the drill pipe to flex or bend, and the use of excessive weight or downward thrust on the bit which tends to cause flexure or bending of the drill and canting of the bit. Definite measures have been developed for correcting the tendency of the bit to deviate from the vertical, but such measures are of little use in the absence of definite information of the position of the bit with respect to the vertical during the progress of the drilling operations, so that the operator may know when these corrective measures should be taken. It is the general purpose of this invention to provide means whereby the operator of a drilling apparatus may be furnished with this highly important information.

More particularly, the object of the present invention is to provide an apparatus of simple and rugged construction, adapted to be mounted in the drill stem adjacent the bit or collar or at any other suitable position, and to provide an accurate and continuous record of the deviation of the drill bit or other portion of the drill from the vertical.

A particular object of the invention is to provide a device by means of which the measurement of the deviation may be obtained quickly and easily.

Another important object of the invention is to provide a device which is adapted to accurately measure, and produce a record of, the deviation of the bit or drill during the times when the drilling action is taking place; for example, during the rotative movements of a rotary drill bit or at the time of impact of the bit in a drum drill.

A further object is to provide a device which contains a minimum number of moving parts, is entirely free from sensitive and complicated mechanism, and requires no delicate adjustment, and is therefore adapted to withstand the violent mechanical shocks to which any such apparatus is necessarily subjected during the drilling operation.

A further object of the invention is to provide an apparatus for the above purpose which requires a minimum change from the standard assembly of the drilling apparatus so that the drilling operation may proceed in exactly the same manner as usual.

A further object of the invention is to provide a deviation recording apparatus which requires a minimum of time for assembling and placing in position in the drill and also a minimum time for obtaining therefrom the recorded measurements, thus causing delay in the drilling operations and minimizing the lapse of time between the recording of the deviation and the time when the measurements are available to the operator, so that the operator may be advised promptly of any excessive deviation and the necessary corrective measures may be taken before the deviation has progressed so far as to require prohibitive expenditure of time and money for correction thereof.

The apparatus of my invention comprises essentially a record blank, a gravity responsive member movable to different relative positions with respect to said record blank in accordance with the deviation of the apparatus from the vertical and adapted to trace or produce a record on said blank in a position corresponding to the relative position of said gravity responsive member, and means for mounting said record blank and gravity responsive member within the drill pipe or stem adjacent the position of the bit, or at any other suitable location in the drill stem or string, in such manner as to properly position the same with respect to the axis of the drill. For use with rotary drilling apparatus, such mounting means must be adapted to permit free flow, through the drill pipe and past the piston of the record blank and gravity responsive member, of the circulating fluid or mud which is ordinarily used in the operation of drilling apparatus of this type. The record blank and gravity responsive member are, in that case, preferably mounted within an enclosed casing which may be inserted in one of the sections of drill pipe or preferably in a special "sub" or short coupling section connected between two sections of drill pipe or between the bit or collar and the portion of the drill stem directly above the same, or at any other desired point in the drill stem above the bit. Other advantageous features which are embodied in the preferred form of my invention, will be described hereinafter.

The accompanying drawings illustrate embodiments of my invention and referring thereto:

Fig. 1 is a diagrammatic representation of a drill hole with a rotary drilling apparatus therein, showing the deviation measuring apparatus of my invention mounted adjacent the bit.

Fig. 2 is a vertical section of the measuring apparatus and the coupling or "sub" in which it is mounted.

Fig. 3 is a horizontal section on line 3—3 in Fig. 2.

Fig. 4 is a horizontal section on line 4—4 in Fig. 2.

Fig. 5 is a side elevation of the enclosed casing in which the recording means is located, taken at right angles to Fig. 2.

Fig. 6 is a view similar to Fig. 2, but with the apparatus in a position inclined from the vertical.

Fig. 7 is a section on line 7—7 in Fig. 6, showing the record traced upon the record blank by the gravity responsive member.

Fig. 8 is a cross-section of one form of record blank for use in my apparatus.

Fig. 9 is a side elevation of a simple form of angle measuring scale which may be advantageously used for reading or measuring the angle of deviation, from the record on the record blank.

Fig. 10 is a perspective view showing the method of use of this angle measuring scale.

Fig. 11 is a vertical section of a modified form of recording apparatus mounted within a modified form of "sub".

Fig. 12 is a transverse section on line 12—12 in Fig. 11.

Fig. 13 is a transverse section of a record blank having a varying radius of curvature.

Fig. 14 is a side elevation of an angle measuring scale for use with the record blank shown in Fig. 13.

Fig. 15 illustrates a modified form of deviation responsive member.

Fig. 16 is a vertical section illustrating a suitable means for mounting the deviation measuring apparatus in a churn drill.

Referring to Fig. 1, a bore hole is shown, comprising an upper portion 1 of relatively large diameter provided with a string of casing 2 cemented off at its lower end in the usual manner as shown at 3, and a lower portion 4 of somewhat smaller diameter. A drilling apparatus of the rotary type is shown, comprising a drill stem consisting of a string of rotary drill pipe 5 having a bit 6 and the usual collar 7 at the lower end thereof and provided at its upper end with bevel gear means 8 for effecting rotation thereof at any usual or suitable speed. The upper end of the drill pipe is connected through the usual swivel 9 and flexible hose 11 to a pump 12 whose inlet pipe 13 leads to a sump or other storage means 14 in which is provided a supply of mud or fluid of proper consistency for circulation through the drill pipe. From the upper end of casing 2, a pipe 15 leads to the sump or storage means 14. It will be understood, of course, that the drill pipe and collar 7 are provided with internal passages forming a continuous passage for downflow of fluid throughout its entire length, the lower portion of said passage being indicated in dotted lines at 16, and the drill bit 6 is provided with one or more passages 17 communicating with the lower end of passage 16 for permitting outflow of such fluid adjacent the cutting edges or faces of the bit.

The deviation measuring apparatus of my invention is shown in Fig. 1 as being mounted adjacent the bit or the lower portion of the drill stem, as indicated in dotted lines at A. The special coupling commonly referred to as a "sub", in which the measuring device is mounted, is indicated at B, and is shown in this case as connected between the collar 7 and the lowermost section of the drill pipe. It will be understood, however, that the coupling section B may be connected at any suitable point in the drill stem in case it is desired to determine the deviation of the drill stem from the vertical at some other point than adjacent the bit. The principal purpose for which my apparatus is intended, however, is to follow the course of the bit during the progress of the drilling operation, in order that any tendency of the bit to deviate excessively from the vertical may be detected and corrected before it has gone too far, and for this purpose the measuring apparatus should be located substantially in the position shown, or as close to the bit as is practicable.

The measuring device A and the "sub" B in which it is mounted are shown in detail in Figs. 2 and 3, and certain portions of the measuring device are further shown in Figs. 4 and 5. Said measuring device comprises a small casing 21 of cylindrical or other suitable shape, closed at its lower end as shown at 22 and provided at its upper end with a removable cover 23 which may be threaded thereon as at 24 or otherwise secured thereto in any suitable manner.

The record blank is shown as comprising a concave or dished circular plate 26 placed with the concavity upwardly, so that the upper face or recording surface thereof is concave and constitutes a portion of a predetermined surface of revolution with the center of curvature of all portions located somewhat above said plate. The recording surface may, for example, be a portion of a spherical surface, and in that case the radius of curvature of said surface is such that the total angle subtended by the plate is somewhat greater than twice the maximum angular deviation at which the apparatus is intended to be operated, it being understood that plates having different radii of curvature may be used interchangeably according to the degree of deviation which must be measured. In general, it is desirable to use a plate having the greatest possible radius of curvature for any contemplated maximum deviation, in order to provide maximum accuracy and sensitivity of measurements. The peripheral portion of plate 26 rests upon an annular shoulder or ledge 27 inside the casing 21 and perpendicular to the axis of the casing, and the interior of said casing above said shoulder is of sufficient diameter to permit said plate to be inserted and removed therethrough. When in position on the annular shoulder 27, the radius of curvature of the upper surface of the record blank, at the center thereof, preferably extends parallel to, and substantially coincides with, the normally vertical axis of the casing 21, and the radius of curvature at this point constitutes the axis about which the recording surface is developed. The bottom wall 22 of the casing is preferably spaced or recessed somewhat below the shoulder 27, so that plates of varying curvatures may be placed upon said shoulder without striking the bottom of the casing.

In order to firmly hold the record plate 26 on the shoulder 27 I provide an inverted cup-shaped retainer 28 having its central portion spaced somewhat above the record plate and provided with a depending annular flange 29 engaging the periphery of said plate. Said retainer is held in firm engagement with the plate by means of a spring 31 mounted at 32 beneath the cover 23 and having a plurality of arms 33 resiliently engaging said retainer.

A gravity responsive member, such as a round ball 34 of steel or other metal or material of suitable hardness, is placed within the casing 21 and resting directly upon the surface of the record plate 26, the space between said plate and the retainer 28 being sufficient to permit free rolling movement of said ball over the surface of said plate. In case strong magnetic effects are encountered, a member of brass or other non-magnetic material may be used. Also, if desired, the gravity responsive member may be made of stainless steel, Monel metal, or other corrosion resisting material. During rotation of the drill, accompanied by jamming of the bit against the formation, as hereinafter explained, the plate 26 is caused to repeatedly move or slide in contact with the ball 34, and suitable provision is made for causing said ball to make an impression or record upon the portion of the surface of said plate which is thus repeatedly brought into engagement with the ball. I have found that sufficiently satisfactory records or marks for many purposes may be obtained by the use of a ball and plate formed of suitable metals, for example, a steel ball and an aluminum plate. However, I find that a more sharply defined impression or record can be made by maintaining a supply of suitable abrasive material at the point of frictional engagement of the ball with the plate. For this purpose the recording plate shown in detail in Fig. 8 may be used to good advantage. The upper face of said plate, prior to mounting thereof within the measuring unit, is provided with a thin coating 37 of a suitable compound containing abrasive material mixed with a suitable soluble binder, and the interior of the casing is filled with a liquid adapted to dissolve said binder and release the abrasive material. For example, said compound may consist of finely divided carborundum as an abrasive material mixed with a water soluble glue or paste as a binder, and the interior of the casing may be filled with water, which readily dissolves the glue and causes the carborundum to become suspended in the water and provide the necessary abrasive action at the point of engagement of the ball 34 with the record plate. The introduction of the abrasive material in this manner is not essential and it may be found sufficient in certain cases to place a suitable amount of abrasive material in suspension in liquid within the casing. Good results have been obtained in certain cases with the use of the regular drill mud for this purpose, but this is open to the objection that the characteristics of the mud vary in different localities and also in accordance with the character of material through which the hole is being drilled.

The interior of the casing is preferably filled with liquid, for the purpose of damping relative movement of the ball, and also for better maintaining the supply of abrasive material at the point of contact of the ball with the record blank. In order to permit access of this liquid to all parts of the interior of the casing, the retainer 28 is preferably provided with a central opening 39, and the inside wall of casing 21 is also preferably provided with one or more grooves or passages 41 extending from below the record plate 26 to the upper end of the casing. By this means the liquid is permitted to circulate through and fill the entire interior of the casing, and the upper portion of groove 41 permits any surplus liquid to be forced out therethrough and between the casing and the cover 23 as said cover is screwed into closed position. The filling of the interior of casing 21 with liquid has the additional advantage of eliminating the necessity of maintaining a water tight joint between cover 23 and said casing capable of withstanding the high pressure encountered in deep holes. It will also be observed that the entire device is of such simple and rugged construction that even if some of the circulating mud should be forced under the existing pressure into the interior of the measuring unit, no harm to the apparatus or interference with the operation thereof would result.

As another alternative, the coating 37 on the record plate may consist of paint or other material adapted to be worn by the friction of the ball and expose the metal or other material underneath. In general, it is to be understood that my invention includes the use of any means whatever for causing the friction or movement of the gravity responsive member to mark or change the appearance of the portion of the record plate which are moved in contact therewith upon rotation of the drill.

The "sub" or coupling B is provided with suitable means, such as pin and box end connections 42 and 43 at its respective ends, for connection to the collar and drill pipe or between any desired portions of the drill stem, and is provided with a passage 44 extending therethrough and establishing communication between the portions of the fluid passage 16 in the drill stem above and below the same. A portion of the passage 44 is enlarged as shown at 45, to a diameter somewhat greater than the outside diameter of the measuring unit A and throughout a height somewhat greater than the height of the said unit, so as to provide an annular space around said unit through which the drill mud may circulate, and suitable means are provided for supporting and centering the unit within said enlarged portion of the passage. For this purpose the casing 21 is shown as provided with a plurality of downwardly projecting radial vanes 46 whose lower ends rest upon a shoulder 47 adjacent the lower end of the enlarged passage 45, and the cover 23 is shown as provided with one or more upwardly projecting vanes 48 whose outer faces engage an annular face 49 in the "sub" above said enlarged passage. The entire measuring unit A may, therefore, be readily inserted and removed through the upper end of the "sub" and is accurately centered and aligned therewith regardless of the position to which it may be turned therein. One of the upwardly projecting vanes 48 may advantageously be provided with an opening 51 to facilitate manual grasping thereof for inserting and removing the measuring unit. The other vanes are shown as cut away at 50 to permit access of the hand to the opening 51.

The invention also comprises a simple but novel form of angle measuring scale adapted for use in measuring or reading, from the record produced on the record blank, the angular deviation of the bit which caused such record to be made. Said scale, as shown in Fig. 9, comprises a flat plate 52 of suitable material, having one edge 53 suitably curved to conform approximately to the surface of the record blank, for example, for use with a record blank whose surface is a part of a sphere, said curved edge may be formed as an arc of a circle whose radius is equal to the radius of curvature of the upper face of the record blank, it being understood that when a series of record blanks of different curvatures are used, a corresponding series of scales with corresponding curvatures may also be used. Along the arc-shaped edge 53 are provided a series of suitably spaced marks or graduations designated at 55 by numbers progressing from zero at one end of the scale up to the maximum deviation for which the corresponding record blank is adapted. A peculiar characteristic of this scale is that the numbers opposite the respective marks or graduations do not indicate the full angle subtended by the portion of the scale between the corresponding marks or graduations and the zero mark thereof, but designate one-half the number of degrees in the total angle subtended by a corresponding diameter on the record blank, the reason for which will be explained hereinafter.

In rotary drilling operations it is customary to remove the drill and bit from the hole from time to time, for the purpose of inspecting, replacing, repairing or dressing the bit or for other purposes, and in ordinary oil well drilling operations this removal of the drill stem and bit usually occurs from once to several times each day. When it is desired to use the above described apparatus for determining the deviation of the bit from the vertical, the apparatus is mounted in the desired position in the drill stem, preferably as close to the bit as is practicable, before starting to lower the drill into the well after it has been so removed therefrom. Before placing the measuring device in the drill stem, a fresh record blank, having its upper surface substantially free from marks which would tend to prevent the production of a clear record thereon, is inserted in the position shown in Fig. 2 and the ball 34 is placed thereon. The retainer 28 is then placed in position and the interior of casing 21 is preferably filled with a liquid as above described. The cover 23 is then screwed in position, and in order to insure complete filling of the casing with liquid I prefer to place therein a greater volume of liquid than the same will hold when the cover is in closed position, so that the screwing on of the cover will cause the excess liquid to be displaced up through the groove 41 and out between the cover and the upper edge of casing 21. The measuring device A, after being thus assembled, is placed within the coupling section B as also shown in Fig. 2, and this coupling section is then connected at the desired position in the drill stem.

The drill is then lowered into the hole and drilling is carried out in the usual manner. If the position of the bit remains exactly vertical, the ball 34 will remain exactly in the center of the record blank 26, and the turning of the record blank beneath said ball will merely cause a small round mark to be made at this position. However, in case the bit deviates from the vertical, for example, to the angle shown in Fig. 6, the axis of the measuring unit will also be tilted to the same degree and the ball 34 will be caused by gravity to roll away from the center of the record blank to the lowest point thereof. It is evident from Fig. 6 that the ball 34 will tend to remain directly beneath the center of curvature of the upper surface of the record blank 26, and that the angle α subtended by the arc through which the ball is displaced from the center of the record blank is equal to the angular deviation of the axis of the measuring apparatus, and hence the axis of the bit or other portion of the drill whose deviation is to be measured, from the vertical. With the ball in this position, rotation of the disc due to rotation of the drill will cause the record blank to move or slide beneath the ball, and the frictional engagement of the ball with the surface of the record blank, together with the sharp vertical jars imparted to the record blank due to the bit sticking and slipping of the projections in the formation at the bottom of the hole, assisted by the action of the abrasive material in case such material is used, will cause a circular mark or record to be produced on the record blank, as shown at M in Fig. 7. This record may consist of scratches, pit marks, or other marks caused by abrasion or repeated wear. The radius of this circle varies with the deviation of the drill stem from the vertical.

It might at first appear that rotary motion imparted to the ball 34 due to frictional engagement of the record blank therewith would cause a centrifugal force on said ball which would cause the same to be displaced outwardly from the center of the record blank beyond the true position of the lowermost point thereof. Tests of the apparatus during actual drilling operations and in the laboratory have shown that this is not the case, and a careful consideration of the action of the bit during drilling operations will explain why this centrifugal force does not affect the accuracy of the instrument. During ordinary drilling operations, although the upper end of the drill stem is continually rotated, the bit itself does not rotate continually, but is extremely jerky in its operation. With the bit resting on the bottom of the hole, the downward thrust thereon will cause a high resistance to rotative movement thereof against the formation. Rotation of the upper end of the drill stem causes a torque in the drill pipe and an actual twisting thereof with a resultant shortening of the drill stem. The torsional strain increases and the downward thrust decreases due to shortening of the drill stem, until the frictional resistance is overcome by the torque. During all of this time there is substantially no rotative movement of the bit, and the ball 34 will therefore remain substantially at rest in its true position. At the instant the torque overcomes the frictional resistance, the bit breaks loose from the formation and rotates at a very high velocity for a short interval of time until the torque is decreased and the bit is again brought to rest by engagement with the formation. This sudden rotative motion of the bit causes the record blank to also rotate rapidly, while the ball 34 and the liquid surrounding the same remain practically stationary. As a result, the ball scratches, marks or otherwise produces a record upon the surface of the record blank during this movement, and particularly during the first part thereof while the rotative motion of the bit is the most rapid and before any substantial motion has been imparted to the ball. Furthermore, the striking of the bit, while rapidly rotating, against upward projection in the formation at the bottom of the hole, will cause the record blank to be subjected to a sudden upward movement against the ball, which will cause the ball or the abrasive material to dent, pit, or otherwise mark the surface of the blank. The above described operation is ordinarily repeated many times a minute, with the usual speed of rotation of the bit, and it can be proved and demonstrated that the time during which the bit is at rest is ordinarily much greater than the time during which it is rotating. For this reason the ball has ample opportunity to come to rest between successive rotative impulses of the bit and is prevented from itself acquiring sufficient rotative velocity to cause any appreciable centrifugal force thereon. It is to be noted furthermore, that the sliding friction between the ball and the record blank, which causes scratching of the surface of the blank, can occur only when the blank is moving relative to the ball, and not when the ball is moving with the blank, and no marking due to this action, at least, can therefore occur during any momentary movement of the ball with the blank, when it might be momentarily displaced outwardly by centrifugal force. As the drilling operation is thus continued for a period of several hours, more or less, the ball will be caused to produce a clearly discernible mark or record upon the record blank, and such mark will give a cumulative record of the deviation of the bit during the entire period of drilling.

When it is necessary to stop drilling and withdraw the bit from the hole, the coupling section B may be removed, and the measuring unit A withdrawn therefrom and opened up. Upon removal of the record blank, the radius or diameter of the circular record produced thereon may be measured and the angular deviation thus accurately determined. For this purpose I prefer to use the angle measuring scale 52, and the manner of use thereof is shown in Fig. 10. The zero mark of the scale is placed upon the circular mark at one side and the arc-shaped edge of the scale is placed so as to pass through the center of the record blank. The mark or graduation of the scale which is then in line with the opposite side of the circular mark will then indicate the actual deviation of the bit from the vertical. It is evident that the total angle subtended between the two sides of the circular mark is equal to twice the angle $\alpha$ in Fig. 6, and it is for this reason that the numbers opposite the graduations or marks of the scale indicate only one-half the total angle subtended by the scale, in order to permit direct reading of the deviation instead of requiring division by two in each case.

A somewhat modified form of deviation measuring apparatus is shown in Figs. 11 and 12. This form of apparatus comprises a gravity responsive member in the form of a pendulum or weight 65 which is suspended as by means of rod 66 from a ball 67 which is preferably mounted on ball bearings 68 so as to permit free swinging of the weight 65 in any direction through an angle equal to the maximum deviation which is to be measured. The weight 65 is shown as resiliently mounted upon rod 66 by clamping the same between resilient pads 69. The upper resilient pad bears against a flange 71 secured to rod 66 in any suitable manner as by sweating thereon, while the lower pad is held in position by means of a retaining nut 72 screwing on the threaded lower end 73 of rod 66. Nut 72 may be tightened so as to compress the resilient pads 69 to any desired extent, so as to hold the weight 65 against lateral movement relative to rod 66 while absorbing vertical shocks and permitting the weight to swing without causing undue sudden vertical movement thereof due to the jerking action of the bit. A record blank 26a, which may be substantially the same as the record blank 26 above described, is mounted beneath the weight 65 and rests as before upon a shoulder 27a on casing 21a. A cup-shaped retainer 28a holds the record blank in position on said shoulder and is itself resiliently held in position by means of spring 31a secured to the cover 23a. The ball bearings 68 for the weight 65 are mounted within a supporting member 75 which is supported in any suitable manner on the retaining cup 28a.

A marking element 76 projects downwardly from the center of weight 65 in position to engage and mark upon the upper surface of the record blank 26a. In order to resiliently hold said marking element in engagement with the record blank, said marking element may be slidably mounted in a bore 77 in rod 66 and a compression spring 78 may be mounted in said bore so as to force said marking element downwardly with any suitable pressure. The marking element 76 and the upper surface of the record blank 26a may be of any suitable nature such as to cause said marking element to mark on said surface upon movement of said surface with respect to the marking element. For example, the marking element 76 may be a sharp pointed member of steel or other suitable metal and the upper surface of the record blank may be of a somewhat softer metal so as to be scored or scratched by said element, or the upper surface of said record blank may be coated with white paint or other suitable light colored material and the marking element may consist of lead or other suitable material adapted to mark on said surface in a manner similar to an ordinary lead pencil.

I have also shown in this case a modification in the means for mounting and positioning the measuring apparatus within the drill stem, but it will be understood that the form of recording means shown in Figs. 11 and 12 may, if desired, be mounted within the drill stem by means similar to those shown in Figs. 2 and 3, and also that the form of deviation measuring means first described may, if desired, be mounted in the drill stem in the manner shown in Figs. 11 and 12. In said figures the sub or coupling section B', which may be connected in the drill stem in substantially the same manner as the coupling section B above described, is provided with an enlarged passage 45' and with a plurality of centering ribs 81 projecting inwardly into said enlarged passage. The space between the inner edges of said ribs is just sufficient to receive the casing 21a, and said ribs are provided with shoulders 47a adapted to support said casing. In order to insure turning of the casing 21a with the drill stem, said casing may be provided with a lug 82 adapted to project outwardly between any two of the ribs 81, as shown particularly in Fig. 12. However, mechanical keying of the deviation measuring device to the drill stem, so as to cause the same to rotate therewith, has not been found necessary in practice, as the frictional engagement, together with the engagement of the radial vanes on the measuring device with the downwardly moving fluid in the drill is in general sufficient for this purpose. For this reason, no such keying means are shown in the first-described form of the invention, and lug 82 shown in this case may not be essential. On the other hand, it will be understood that similar keying means may, if desired, be provided in connection with the form of apparatus shown in Figs. 2 to 6. The cover 23a may be provided with a suitable handle such as shown at 83, for facilitating insertion of the measuring apparatus into the coupling section B' and removal of said apparatus therefrom.

As above stated, the recording surface of the record blank of my apparatus is preferably substantially in the shape of a concave surface of revolution whose axis extends substantially parallel to the axis of the drill and is preferably substantially coincident therewith. It is not essential, however, that this surface constitute part of a spherical surface as shown in Figs. 2 and 8. For example, such surface may be a parabaloid, or a portion of an elipsoid, or it may consist of a concave surface having a varying radius of curvature. As an example, the record blank 26' shown in Fig. 13 has its upper surface formed with a radius of curvature which progressively decreases from the central portion thereof toward the outer edge portion. The centers of curvature of the upper surface of said blank at the points $P_1$ to $P_6$ inclusive are indicated at $C_1$ to $C_6$ inclusive. All of said centers lie on the axis X—X extending through the center of the blank. It is evident that with a record blank of this form, an equal angular deviation corresponds to a much greater distance on the recording surface adjacent the center thereof than adjacent the outer edge thereof. In the particular case illustrated, the angular deviation of the line $C_6$—$P_6$ from the normally vertical axis X—X is twice as great as of the line $C_5$—$P_5$, but it will be observed that the distance $P_1$—$P_5$ is considerably greater than the distance $P_5$—$P_6$ on the surface of the blank. A record blank of this form is, therefore, adapted to afford more accurate measurement of small angular deviations than of larger angular deviations. It may be seen that by forming the recording surface with a radius of curvature increasing from the central portion toward the outer edge portion thereof, the situation may be reversed and more accurate measurement obtained of the larger angular deviations.

A form of angle measuring scale suitable for use in connection with the form of recording blank shown in Fig. 13 is illustrated in Fig. 14. The edge 53' of said blank is curved to conform substantially to the average curvature of the record blank so as to permit the same to be placed in relatively close proximity to the surface of the record blank at any portion thereof. The angular graduations 54', however, are spaced considerably further apart adjacent the zero mark of the scale than at the other end, the distance of any mark on said scale from the zero mark corresponding to the distance between two diametrically opposite points equally removed from the center of the record blank and so located that the angle subtended between these two points is equal to twice the number of degrees indicated by the numeral placed opposite said mark. It is evident that by the use of this scale, relatively small angular deviations may be measured or estimated with somewhat greater accuracy than relatively large angular deviations.

Modifications may also be made in the means for causing the gravity responsive member to mark upon the surface of the record blank. For example, the surface of the ball 34 in the form of apparatus first described may be milled or roughened in any suitable manner, or as shown in Fig. 15, the gravity responsive member may consist of a ball 34' formed of or coated with carborundum or other suitable abrasive material.

The deviation measuring apparatus of my invention is also applicable to so-called churn drill apparatus, in which the drilling is accomplished by reciprocating or "up and down" movement of a drill bit mounted at the bottom of a string of tools suspended in the whole by a suitable cable. In such apparatus the reciprocating motion of the bit is caused by alternately raising the upper end of the cable and allowing the same to fall whereupon the weight of the bit and the string of tools causes the bit to fall with considerable momentum and penetrate or crush the formation, and the upper end of the cable is turned through a horizontal angle from time to time so as to cause the bit to also turn to different positions in the hole and produce a round hole instead of a flat one. A form of deviation measuring device and mounting means therefor suitable for use in drilling apparatus of the churn type is shown in Fig. 16. A short coupling member, such as indicated at B'', may be provided with suitable means at its upper and lower ends for connection at any desired position in the string of tools. For example, such coupling member is shown as provided at its lower end with a box joint 92 for connection to the pin of the bit, and at its upper end with a box joint 93 which may be connected directly to the lower end of a member of the string of tools having a pin connection, or which may be adapted by means of a coupling member 94 having pins at both ends, for connection to the drill stem or other member of the string of tools having a box joint at its lower end. The coupling member B'' is provided with a chamber 95 in which is mounted the deviation measuring device indicated at A''. Said device is shown as comprising a casing 21b provided with a removable cover 23b and containing record blank 26b, gravity responsive member 34b, retainer 28b and holding spring 31b, all of which are shown as being of substantially the same construction as in Fig. 2, but which may be of any of the forms above described. The cover 23b is shown as provided with a handle portion 96 by means of which it may be easily inserted in and removed from the chamber 95. In case the frictional engagement of the casing 21b with the walls of chamber 95 is insufficient to insure turning of said casing with the bit, suitable means such as downwardly projecting pin 97 on said casing engaging in a recess 98 at the bottom of the chamber may be provided for this purpose. In this case also the interior of casing 21b preferably contains a supply of liquid, and any suitable means such as above described may be provided for insuring marking by the gravity responsive member 34b of the portions of the surface of the record blank 26b with which it is in contact during the drilling operation.

In the operation of a churn drill provided with an apparatus such as above described, the gravity responsive member will, as before, always move to the lowermost point of the surface of the record blank. Each time the bit strikes the bottom of the hole, the downward movement of the record blank will be suddenly arrested, and the sudden downward force exerted thereon by the gravity responsive member due to the downward momentum thereof will cause a mark to be made on the surface of the record blank, particularly in case suitable abrasive material is maintained at the point of contact thereof. As the drill is turned from time to time, the gravity responsive member will be brought into engagement with different portions of the record blank, but always at a distance from the center thereof corresponding to the angular deviation of the drill, and will therefore produce as before a circular record on the surface of the record blank whose radius corresponds to the angular deviation of the drill at the times of impact of the bit against the bottom of the hole. When the bit and string of tools are removed from the hole, as is customary from time to time for the purpose of replacing the bit, the coupling member 91 may be removed and the deviation measuring device may be removed therefrom and opened up. The record blank may then be removed and the angular deviation of the drill from the vertical may be quickly determined, for example by means of an angle measuring scale such as above described.

I claim:

1. An apparatus for measuring deviation of rotary drills from the vertical, comprising a record blank, means for mounting said record blank in a rotary drill stem in fixed relative position with respect to said drill stem, a gravity responsive member engaging the surface of said record blank and movable to different positions thereon dependent upon the angular deviation of the axis of the drill stem from the vertical, said gravity responsive member being adapted to produce a record on the surface of said record blank due to engagement therewith during successive rotative movements of said drill stem.

2. An apparatus for measuring deviation of a drill from the vertical comprising a record blank having a concave recording surface formed as a surface of revolution, a gravity responsive member movable to engagement with different parts of said recording surface in accordance with variations in the deviation of the axis of said surface from the vertical, said gravity responsive member being adapted to produce a record on said recording surface in the position of engagement therewith during the operation of the drill, and means for mounting said record blank in a drill with its axis substantially parallel to the axis of the drill while permitting free relative movement of said gravity responsive member.

3. A deviation measuring device for drilling apparatus, comprising a casing adapted to be mounted in a drill, a record blank mounted in relatively fixed position within said casing and having its upper face concave and forming part of a surface of revolution whose center of curvature lies directly above the center of said upper surface of the record blank when said device is in vertical position, and a gravity responsive member mounted within said casing and movable to different relative positions with respect to said record blank upon tilting of said device from the vertical, said gravity responsive member being adapted to engage said upper surface of the record blank and produce a mark thereon upon movement of said device imparted thereto by operative movements of the drill.

4. A deviation measuring device as set forth in claim 3, the interior of said casing containing a body of liquid surrounding said gravity responsive member at all positions of engagement thereof with said record blank.

5. A deviation measuring device as set forth in claim 3, and comprising in addition, means for introducing abrasive material between said gravity responsive member and said record blank at the point of engagement therebetween.

6. A deviation measuring device for drilling apparatus, comprising a record blank having a concave recording surface formed as part of a spherical surface, a gravity responsive member movable by gravity to operative relation with different parts of said record blank dependent upon the position of said record blank with respect to the vertical, and means for mounting said record blank in a drill with the recording surface thereof substantially symmetrically disposed with respect to the axis of the drill, said gravity responsive member being adapted to produce a mark on the portion of the record with which it is in operative relation during the operative movement of the drill.

7. An apparatus for measuring deviation of a rotary drill from the vertical comprising a record blank whose upper surface is concave and forms a portion of a surface of revolution, means for mounting said record blank within a rotary drill stem in such position that the center of curvature of said upper surface lies substantially directly above the center of said upper surface when the axis of the drill stem is vertical, said mounting means affording passages permitting free flow of circulating fluid past the position of the record blank within the drill stem, and a gravity responsive member engaging said upper surface of the record blank and movable by gravity to the lowest point of said surface, and means whereby relative movement of said record blank in engagement with said gravity responsive member upon successive rotative movements of the drill stem is caused to produce a mark on said record blank whose position is dependent upon the relative position of the gravity responsive member with respect thereto.

8. A deviation measuring device as set forth in claim 3, and comprising in addition, a coating for the upper surface of said record blank comprising a soluble binder and abrasive material incorporated therein, and a quantity of liquid within said casing and in contact with said coating and adapted to dissolve said binder and release said abrasive material so as to cause said gravity responsive member to mark said recording surface upon relative movement thereof.

9. A deviation measuring device for drilling apparatus, comprising a casing, a record blank mounted within said casing and having a recording surface formed as a concave surface of revolution, a gravity responsive member within said casing and movable to different positions with respect to said recording surface dependent upon the angular position of said surface with respect to the vertical, said gravity responsive member being adapted to produce a mark on said recording surface at the relative position of said gravity responsive member, and a removable cover for said casing, said recording surface being concave upwardly, and said gravity responsive member comprising a substantially spherical ball mounted so as to roll freely over said surface under the action of gravity, said gravity responsive ball having an abrasive surface.

In testimony whereof I have hereunto subscribed my name this 15th day of May 1930.

JOHN J. JAKOSKY.